(12) United States Patent
Budmiger

(10) Patent No.: US 7,946,184 B2
(45) Date of Patent: May 24, 2011

(54) ELECTROMAGNETIC FLOWMETER HAVING TEMPERATURE MEASUREMENT VALUE FOR CORRECTING ELECTRICAL CONDUCTIVITY VALUE

(75) Inventor: Thomas Budmiger, Ettingen (CH)

(73) Assignee: Endress + Hauser Flowtec AG, Reinach (CH)

( * ) Notice: Subject to any disclaimer, the term of this patent is extended or adjusted under 35 U.S.C. 154(b) by 207 days.

(21) Appl. No.: 11/990,640

(22) PCT Filed: May 11, 2006

(86) PCT No.: PCT/EP2006/062245
§ 371 (c)(1),
(2), (4) Date: Apr. 2, 2009

(87) PCT Pub. No.: WO2007/020111
PCT Pub. Date: Feb. 22, 2007

(65) Prior Publication Data
US 2009/0205438 A1    Aug. 20, 2009

(30) Foreign Application Priority Data
Aug. 17, 2005  (DE) .......................... 10 2005 039 223

(51) Int. Cl.
*G01F 1/58* (2006.01)
(52) U.S. Cl. .................................................. 73/861.12
(58) Field of Classification Search .................. None
See application file for complete search history.

(56) References Cited

U.S. PATENT DOCUMENTS

| | | | | |
|---|---|---|---|---|
| 5,503,026 A | * | 4/1996 | Bohm et al. | 73/861.11 |
| 6,804,613 B2 | * | 10/2004 | Ishikawa et al. | 702/45 |

FOREIGN PATENT DOCUMENTS

| | | |
|---|---|---|
| DE | 74 34 431 U | 8/1976 |
| DE | 43 17 366 A1 | 12/1994 |
| DE | 101 18 001 A1 | 10/2002 |
| DE | 101 18 002 A1 | 10/2002 |
| EP | 0 626 567 A1 | 11/1994 |
| EP | 1 387 148 A2 | 2/2004 |
| JP | 01-248022 | 10/1989 |
| JP | 04-340424 | 11/1992 |
| JP | 05256675 A | 10/1993 |
| JP | 2002-162267 | 7/2002 |
| JP | 2005-207755 | 4/2005 |
| JP | 2005-156555 | 6/2005 |

OTHER PUBLICATIONS

Moawad, Hassan M.M. et al., "Electrical Conductivity of Silver Vanadium Tellurite Glasses", Journal of the American Ceramic Society American Ceramic Soc. USA, Bd. 85, Nr. 11, Nov. 2002.

* cited by examiner

*Primary Examiner* — Harshad Patel
(74) *Attorney, Agent, or Firm* — Bacon & Thomas, PLLC

(57) ABSTRACT

A magneto-inductive flow measuring device providing, in addition to flow information for a medium, also information concerning electrical conductivity of the medium. For a highly accurate determination of the electrical conductivity, the invention provides the following solution: a temperature measuring unit is provided, which makes available information concerning the temperature of the medium. On the basis of the measured temperature, a control/evaluation unit ascertains a correction value for electrical conductivity and makes available a correspondingly corrected value for the electrical conductivity.

11 Claims, 1 Drawing Sheet

ELECTROMAGNETIC FLOWMETER HAVING TEMPERATURE MEASUREMENT VALUE FOR CORRECTING ELECTRICAL CONDUCTIVITY VALUE

TECHNICAL FIELD

The invention relates to an apparatus for measuring flow, e.g. flow rate, of a medium through a measuring tube in the direction of the measuring tube axis.

BACKGROUND DISCUSSION

The measuring apparatus includes a magnet arrangement, which produces an alternating magnetic field passing through a measuring tube essentially perpendicularly to the measuring tube axis; two measuring electrodes positioned in the measuring tube on a connecting line directed essentially perpendicularly to the measuring tube axis and to the magnetic field; optionally, at least one reference electrode; and a control/evaluation unit, which delivers information concerning the volume- or mass-flow of the medium in the measuring tube on the basis of the measurement voltage induced in the measuring electrodes and which determines electrical conductivity of the medium on the basis of impedance measured between two electrodes.

Magneto-inductive flow measuring devices, the essential components of which have been set-forth above, make use of the principle of electrodynamic induction for measuring volumetric flow: Charge carriers of the medium moved perpendicularly to a magnetic field induce a voltage in measuring electrodes likewise arranged essentially perpendicularly to the flow direction. This measurement voltage induced in the measuring electrodes is proportional to the flow velocity of the medium averaged over the cross section of the measuring tube; it is, thus, proportional to volume flow rate. In the case of known density of the medium, it is, moreover, possible to derive also the mass flow rate of the medium flowing through the measuring tube. The measuring electrodes are usually galvanically or capacitively coupled with the medium.

Ordinarily, control of the alternating magnetic field is accomplished using the coil current: In the ideal case, the magnetic field is proportional to the electrical current flowing in the coil, or coils, of the magnet arrangement, since the measuring- or field-frequency of the magneto-inductive flow measuring device (thus, the frequency, with which reversal of the alternating magnetic field occurs) is dependent, in high degree, on the inductance of the coil arrangement.

From a number of publications, it has become known, in the case of a magneto-inductive flow measuring device, to generate, besides information concerning flow, also information concerning other state variables of the medium or the measuring system. Thus, it is known from US2003/0051557 A1 to apply a diagnostic signal between the measuring- and/or reference-electrodes and to obtain information concerning the electrical conductivity of the medium on the basis of resistance values of the diagnostic signals.

From JP-A-174718 and EP 0 336 615 B1, it has likewise become known to determine electrical conductivity of the medium flowing through the measuring tube via resistance values measured between two electrodes. In the case of JP-A-174718, the obtained information concerning the conductivity of the medium is used for correction of the measured values of flow. EP 0 336 615 B1 provides a solution which enables measured values regarding flow and conductivity to be provided simultaneously.

SUMMARY OF THE INVENTION

An object of the invention is to go beyond the known state of the art to provide a magneto-inductive flow measuring device which enables highly accurate determination of state variables on the basis of the resistance between two electrodes.

The object is achieved by providing a temperature measuring unit, which provides information concerning the temperature of the medium, by ascertaining with the control/evaluation unit a correction value for the electrical conductivity on the basis of the measured temperature and by providing a correspondingly corrected value for the electrical conductivity.

In an advantageous further development of the apparatus of the invention, the temperature measuring unit is provided in the realm of the magnet arrangement, with the temperature measuring unit ascertaining temperature of the medium indirectly via measurement of the coil current flowing through the magnet arrangement.

Alternatively, it is provided that the temperature measuring unit is a temperature sensor directly or indirectly in contact with the medium. Especially, the temperature sensor is a PT-100 or PT-1000 temperature sensor. Preferably, the temperature sensor is secured on the measuring tube. The measured temperature values can then be transmitted to the control/evaluation unit as externally ascertained, measured values, analogly as a voltage- or current-signal, or digitally, e.g. over a field bus, via the HART-standard or via the Internet. The control/evaluation unit is preferably accommodated in the measurement transmitter of the magneto-inductive flow measuring device.

Moreover, an advantageous embodiment of the apparatus of the invention provides a plurality of temperature measuring units, with the control/evaluation unit determining an average temperature of the medium on the basis of measured values of temperature provided by the temperature-measuring units.

Preferably, the control/evaluation unit operates the measuring electrodes and/or the reference electrode/reference electrodes in such a manner that measured values for flow and electrical conductivity are provided approximately simultaneously. An alternative embodiment of the apparatus of the invention provides that the control/evaluation unit operates the measuring electrodes and/or the reference electrode/reference electrodes in such a manner that measured values are provided for flow and electrical conductivity, alternately.

Especially, it is provided that the control/evaluation unit determines the correction value for the electrical conductivity signal via the Arrhenius equation.

The Arrhenius equation is:

$$\sigma = \frac{\sigma_0}{T} \cdot \exp\left(-\frac{\Delta G_a}{kT}\right),$$

wherein k stands for the Boltzmann constant, T for temperature (K) and $\Delta G_a$ for the activation enthalpy.

Moreover, an advantageous form of embodiment provides that the reference electrode, or reference electrodes, is/are arranged in the region above the connecting line of the measuring electrodes and/or in the region beneath the connecting line of the measuring electrodes. A corresponding embodiment in the case of magneto-inductive flow measuring devices is that available from the assignee under the mark PROMAG for so-called empty-tube detection.

BRIEF DESCRIPTION OF THE DRAWINGS

The invention will now be explained in greater detail on the basis of the drawing, the figures of which show as follows.

DETAILED DISCUSSION

Figure 1:
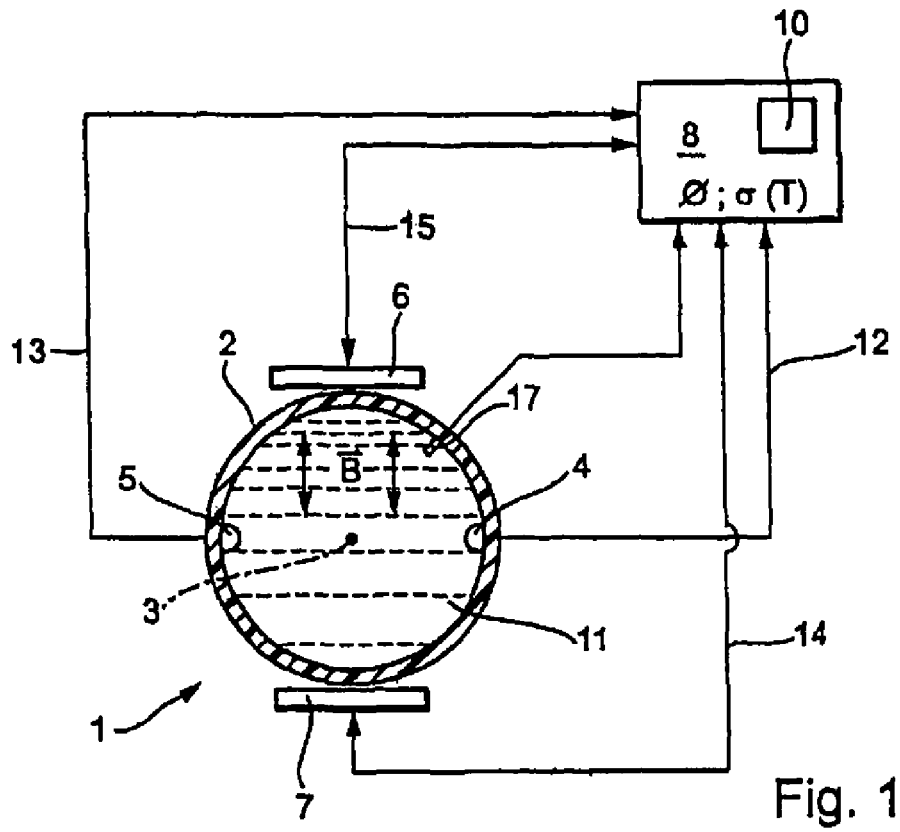
FIG. 1 a schematic drawing of a first form of embodiment of the apparatus of the invention.

FIG. 1 shows a schematic drawing of the first form of embodiment of the apparatus of the invention. Medium 11 flows through the measuring tube 2 in the direction of the axis 3. Measuring tube 2 is itself made of a non-conductive material, or, at least, measuring tube 2 is lined on its inner surface with a non-conductive material.

Magnetic field B, which is directed perpendicularly to the flow direction of the medium 11, is produced via diametrally opposed coil arrangement 6, 7, or two electromagnets. Under the influence of the magnetic field B, charge carriers located in the medium 11 migrate, depending on polarity, to one of the two, oppositely poled, measuring electrodes 4, 5. The voltage established on the measuring electrodes 4, 5 is proportional to the flow velocity of the medium 11 averaged over the cross section of the measuring tube 2, i.e. the voltage is a measure for the volume flow of the medium 11 in the measuring tube 2. Measuring tube 2 is, moreover, connected via connecting elements, e.g. flanges, with a pipe system (not shown), through which the medium 11 flows.

Measuring electrodes 4, 5 are located in direct contact with medium 11; the coupling can, however, also be embodied capacitively, as already mentioned above.

Measuring electrodes 4, 5 are connected with a control/evaluation unit 8 via connecting lines 12, 13. Connection between the coil arrangements 6, 7 and the control/evaluation unit 8 occurs via connecting lines 14, 15

A memory unit 10 is assigned to the control/evaluation unit 8. In the case of the embodiment shown in FIG. 1, the impedance measurement for determining electrical conductivity σ of the medium 11 occurs between the two measuring electrodes 4, 5. Examples of how such a measurement is performed are provided in the two above-mentioned documents of the state of the art.

In the form of embodiment shown in FIG. 1, the temperature measurement is performed in the direct manner: Provided in the upper region of the measuring tube 2 is a temperature measuring unit 17. The temperature measuring unit is preferably a PT-100 or a PT-1000. Temperature measuring unit 17 delivers information concerning the temperature T of the medium 11 to the control/evaluation unit 8. Besides providing information concerning flow, control/evaluation unit 8 also makes available information concerning the electrical conductivity σ of the medium 11. With knowledge of the temperature T of the medium 11 flowing in the measuring tube 2, the control/evaluation unit 8 provides a corrected value for the electrical conductivity σ of the medium 11. The temperature dependence of the conductivity σ of the medium 11 is ascertained, for example, via the Arrhenius equation.

Figure 2:
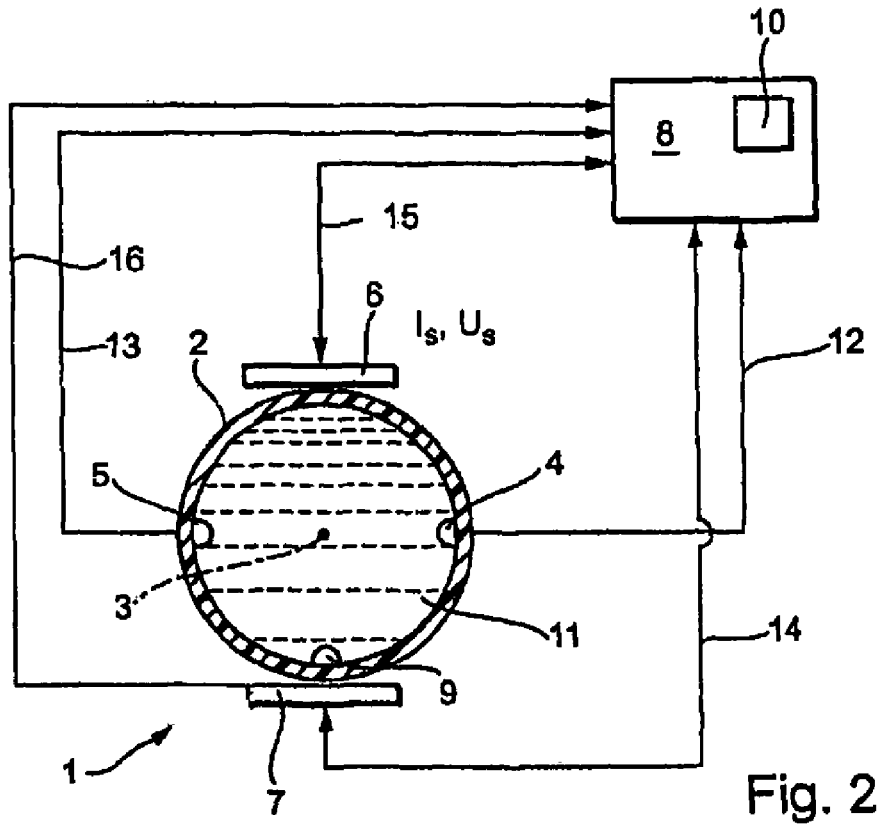
FIG. 2 a schematic drawing of a second form of embodiment of the apparatus of the invention.

FIG. 2 shows a schematic drawing of a second form of embodiment of the apparatus 1 of the invention. This form of embodiment differs from the embodiment shown in FIG. 1 in two respects:

The impedance measurement for determining electrical conductivity σ of the medium 11 is performed between one measuring electrode 4; 5 and a reference electrode 9, which is located in the lower region of the measuring tube 2. The reference electrode 9 is connected with the control/evaluation unit 8 via the connecting line 16.

The temperature measurement is performed indirectly via determination of the coil current flowing through the coil, or coils, of the magnet arrangement 6, 7. Since the magnet arrangement 6, 7 is positioned near the measuring tube 2, it is possible, as an approximation, to assume that the coil current $I_c$ reflects the temperature T of the medium 11.

The invention claimed is:

1. An apparatus for measuring flow a medium flowing through a measuring tube in the direction of a measuring tube axis, comprising:

a magnet arrangement producing an alternating magnetic field passing through the measuring tube essentially perpendicularly to the measuring tube axis;

two measuring electrodes, which are positioned in the measuring tube on a connecting line which is directed essentially perpendicularly to the measuring tube axis and to the magnetic field;

a temperature measuring unit, which makes available information concerning temperature of the medium;

an evaluation/control unit, which delivers information concerning volume- or mass-flow of the medium in the measuring tube on the basis of a measurement voltage induced in the measuring electrodes and which determines electrical conductivity of the medium on the basis of impedance measured between electrodes, wherein:

said control/evaluation unit ascertains a correction value for the electrical conductivity on the basis of the measured temperature and makes available a correspondingly corrected value for the electrical conductivity, said temperature measuring unit is provided in the realm of the magnet arrangement; and said temperature measuring unit ascertains temperature of the medium indirectly by measuring coil current flowing through the magnet arrangement.

2. The apparatus as claimed in claim 1, wherein:

a plurality of temperature measuring units are provided and said control/evaluation unit determines an average temperature of the medium on the basis of measured values of temperature provided by the temperature measuring units.

3. The apparatus as claimed in claim 1, wherein:

said control/evaluation unit operates said two measuring electrodes in such a manner that measured values for flow and electrical conductivity are provided approximately simultaneously.

4. The apparatus as claimed in claim 1, wherein:

said control/evaluation unit operates said two measuring electrodes in such a manner that measured values for flow and electrical conductivity are made available alternately.

5. The apparatus as claimed in claim 1, wherein:

said control/evaluation unit determines the correction value for the electrical conductivity by applying the Arrhenius equation.

6. The apparatus as claimed in claim 1, wherein:

said control/evaluation unit determines the correction value for the electrical conductivity via a mathematical function the Arrhenius equation.

7. The apparatus as claimed in claim 1, wherein:

said control/evaluation unit determines the correction value for the electrical conductivity via a table.

8. The apparatus as claimed in claim 1, further comprising:

at least one reference electrode.

9. The apparatus as claimed in claim 8, wherein:

said at least one reference electrode is/are arranged in a region above the connecting line of said measuring electrodes and below the connecting line of said measuring electrodes.

10. The apparatus as claimed in claim 8, wherein:

said control/evaluation unit operates said at least one reference electrode in such a manner that measured values for flow and electrical conductivity are provided approximately simultaneously.

11. The apparatus as claimed in claim 8, wherein:

said control/evaluation unit operates said at least one reference electrode in such a manner that measured values for flow and electrical conductivity are made available alternately.

* * * * *